(12) United States Patent
Höfig et al.

(10) Patent No.: US 12,066,817 B2
(45) Date of Patent: Aug. 20, 2024

(54) METHOD AND SYSTEM FOR MANUFACTURING INDUSTRIAL GOODS USING INFLUENCE DIAGRAM MAPPED TO MAXIMUM EXPECTED UTILITIES

(71) Applicant: Siemens Aktiengesellschaft, Munich (DE)

(72) Inventors: Kai Höfig, Rohrdorf (DE); Andreas Joanni, Munich (DE); Marc Zeller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 752 days.

(21) Appl. No.: 17/257,776

(22) PCT Filed: Jun. 25, 2019

(86) PCT No.: PCT/EP2019/066866
§ 371 (c)(1),
(2) Date: Jan. 4, 2021

(87) PCT Pub. No.: WO2020/007661
PCT Pub. Date: Jan. 9, 2020

(65) Prior Publication Data
US 2021/0271233 A1    Sep. 2, 2021

(30) Foreign Application Priority Data
Jul. 5, 2018  (EP) .................................... 18181825

(51) Int. Cl.
G05B 19/418    (2006.01)
G06N 7/01      (2023.01)

(52) U.S. Cl.
CPC ......... G05B 19/41875 (2013.01); G06N 7/01 (2023.01); *G05B 2219/32368* (2013.01)

(58) Field of Classification Search
None
See application file for complete search history.

(56) References Cited

U.S. PATENT DOCUMENTS

| 6,349,237 B1 | 2/2002 | Koren et al. |
| 2003/0040954 A1* | 2/2003 | Zelek ............... G06Q 10/04 705/7.29 |

(Continued)

FOREIGN PATENT DOCUMENTS

| CN | 106468910 A | 3/2017 |

OTHER PUBLICATIONS

Howard Ronald A et al: "Influence Diagrams", Decision Analysis, vol. 2, No. 3, pp. 127-143, XP055519545, ISSN: 1545-8490, DOI:10.1287/deca.1050.0020; the whole document; 2005.

(Continued)

*Primary Examiner* — Bernard G Lindsay
(74) *Attorney, Agent, or Firm* — Schmeiser, Olsen & Watts LLP

(57) ABSTRACT

Provided is an application of the described (or similar) decision-theoretic approaches to ensure the quality, output and timeliness of manufactured products for flexible and adaptable production systems, by determining and integrating suitable quality assurance measures which are integrated into the production process in an optimal manner. Thereby, a pareto-optimal sequence of production steps and quality assurance mechanisms are determined that provides an optimal trade-off between target product quality, production time and production costs. Since the approach is performed in an automated way, it can even be performed for flexible production scenarios down to a production of lot size I.

9 Claims, 3 Drawing Sheets

(56) References Cited

U.S. PATENT DOCUMENTS

| | | | |
|---|---|---|---|
| 2004/0267395 A1 | 12/2004 | Discenzo et al. | |
| 2009/0204234 A1* | 8/2009 | Sustaeta | G05B 13/0265 700/29 |
| 2017/0052532 A1 | 2/2017 | Adler et al. | |
| 2018/0341248 A1* | 11/2018 | Mehr | G05B 13/048 |

OTHER PUBLICATIONS

Mourtzis D et al: "Manufacturing Networks Design through Smart Decision Making towards Frugal Innovation", Procedia CIRP, vol. 50, pp. 354-359, XP055519539, NL, ISSN: 2212-8271, DOI: 10.1016/j.procir.2016.04.166, the whole document; 2016.

PCT International Search Report and Written Opinion of International Searching Authority mailed May 5, 2020 corresponding to PCT International Application No. PCT/EP2019/066866 filed Jun. 25, 2019.

European Search Report for Application No. 18181825.3, dated Nov. 7, 2018.

European Exam Report for Application No. 18181825.3, dated Oct. 6, 2020.

\* cited by examiner

FIG 4

Final productionstep (STEP_3) — 41

| STEP 2 | okay | scrap |
|---|---|---|
| okay | 0.8 | 0.0 |
| scrap | 0.2 | 1.0 |

1st productionstep (STEP_1) — 42

| D1 | perform | not perform |
|---|---|---|
| okay | 0.98 | 0.95 |
| scrap | 0.02 | 0.05 |

Value obtained (U1) — 43

| STEP 3 | okay | scrap |
|---|---|---|
| Utility | 100.0 | -20.0 |

Cost of QM1 (U1_1) — 44

| D1 | perform | not perform |
|---|---|---|
| Utility | -5.0 | 0.0 |

2st productionstep (STEP_2) — 45

| D1_1 | perform | | not perform | |
|---|---|---|---|---|
| STEP 1 | okay | scrap | okay | scrap |
| okay | 0.995 | 0.0 | 0.9 | 0.0 |
| scrap | 0.0050 | 1.0 | 0.1 | 1.0 |

Cost of QM2 (U1_1_1) — 46

| D1_1 | perform | not perform |
|---|---|---|
| Utility | -8.0 | 0.0 |

Perform QM2 after step 2? (D1_1) — 47

| perform | 1.0 |
|---|---|
| not perform | 1.0 |

Final production step — 51

| 73.1470 | 93.2606 | okay |
|---|---|---|
| 26.8539 | 25.8479 | scrap |

Value obtained — 52

| 67.7764 |
|---|

1st production step

| 96.5000 | 64.4211 | okay |
|---|---|---|
| 3.5000 | 25.4286 | scrap |

Perform QM1 after step 1 — 54

| 50.0000 | 60.1408 | perform |
|---|---|---|
| 50.0000 | 62.4120 | not perform |

Cost of QM1

| -2.5000 |
|---|

Cost of QM2

| -4.0000 |
|---|

2st production step

| 91.4338 | 69.2606 | okay |
|---|---|---|
| 8.5663 | 23.9448 | scrap |

Perform QM2 after step 2 — 58

| 50.0000 | 61.6768 | perform |
|---|---|---|
| 50.0000 | 60.8760 | not perform |

METHOD AND SYSTEM FOR MANUFACTURING INDUSTRIAL GOODS USING INFLUENCE DIAGRAM MAPPED TO MAXIMUM EXPECTED UTILITIES

This application claims priority to PCT Application No. PCT/EP2019/066866, having a filing date of Jun. 25, 2019, which is based off of EP Application No. 18181825.3, having a filing date of Jul. 5, 2018, the entire contents both of which are hereby incorporated by reference.

FIELD OF TECHNOLOGY

The following relates to a method of manufacturing industrial unit goods in a production process, the method comprising a plurality of successive automated production steps. Further, the following relates as well to a production system for manufacturing industrial unit goods in a production process.

BACKGROUND

The implementation of improved concepts of industrial production processes depends on production systems that provide a high degree of flexibility and adaptability. This applies especially for so-called "Industry 4.0"-production processes and it means that these systems need to be able to react to a wide range of changes in the environment. For instance, for so-called Reconfigurable Manufacturing Systems (RMS), not only the software can be modified, but also the hardware through reconfiguration.

In this context, U.S. Pat. No. 6,349,237 B1 discloses a reconfigurable manufacturing system (RMS) having an adjustable structure is designed based upon market demand and can be readily changed from a first desired production capacity to a second desired production capacity to manufacture a desired amount of products from a family of products. The RMS possesses certain key characteristics (i.e., modularity, integrability, customization, convertability, and diagnosability) that are needed for rapid and cost-effective reconfiguration. A methodology for the design of an RMS, and a complementary methodology for changing the production capacity including reconfiguration and ramp-up of the RMS are also provided.

Moreover, US 2004 0267395 A1 discloses control systems and methodologies for controlling a process having one or more motorized pumps and associated motor drives, which provide for optimized process performance according to one or more performance criteria, such as efficiency, component life expectancy, safety, emissions, noise, vibration, operational cost, or the like. More particularly, D2 discloses employing machine diagnostic and/or prognostic information in connection with optimizing an overall business operation over a time horizon.

This enables to react to (1) internal disturbances of the production system (for example machine failure or maintenance); (2) changes of the existing products that have to be manufactured; (3) introduction of new products that have to be manufactured, due to, e.g., new customers or a changing market structure; and (4) changes in the order parameters (lot size, lead times, etc.).

Despite of this high degree of flexibility and adaptability of production systems, the final products, as a result of the production process, need to satisfy certain quality requirements, for instance with regard to allowable geometric tolerances, reliability of the final product, etc. If these quality requirements are not met, then the final product will either be immediately rejected by end-of-line tests, or, even worse, will show unsatisfactory performance or failure after delivery to the customer.

Hence, certain quality assurance measures need to be defined and implemented at the end, or in the course of the production process. This has always been the case for traditional production systems that do not offer a high degree of flexibility and adaptability. For them, however, it may be possible to select and integrate quality assurance measures into the production process manually and based on previous experience, since the (re-)configuration of traditional production systems is usually performed in a time frame of days or weeks or even more.

For instance, a specific production step (e. g., drilling a hole) can be performed by different machines each with a different probability of failure (e.g., the hole is drilled too deep). Then, it may be better to test the quality of the work piece after a production step performed by a machine with a high probability of failure before performing the next production step in order to sort out work pieces with an incorrect drilling depth. However, if the hole was drilled by a machine with a very high precision, it could be sufficient to perform the quality assurance measure at the regular end of line.

Such scenarios should be considered after each reconfiguration of the production process in order to ensure an acceptable target product quality, output and timeliness. In other words, it must be ensured to produce a certain amount of products for a specific price in a given time.

SUMMARY

Correspondingly, an aspect relates to provide a method for manufacturing industrial unit goods in the context of flexible and adaptable production systems, which is able to be quickly adapted to changed production environments production processes and to dynamically assess the new configuration of the production process during its runtime for the respective product to be manufactured.

The method according to embodiments of the invention disclosure comprises the steps of
   a. identifying and choosing a selection of two or more of a plurality of potential production steps forming the specific production process suitable for the unit good to be manufactured;
   b. defining and establishing a specific utility criterion for the production process, wherein the specific utility criterion includes or combines a parametrization of at least one of achieved product quality, product output or timeliness;
   c. selecting and respectively assigning a suitable quality assurance measure to at least one of the production steps and integrating the quality assurance measure(s) into the production process;
   d. dynamically assessing each of the production steps and, if applicable, its respective quality assurance measure whereby probability and/or utility values related to each of the respective production steps are obtained;
   e. dynamically assessing the production process as a whole by applying a decision-theoretic-approach-based assessment to the probability and/or utility values obtained from the production steps and its quality assurance measure, respectively, in order to provide an optimized value of the specific utility criterion;
   f. performing at least one of the quality assurance measures as indicated by an optimized value of the specific utility criterion;

g. obtaining at least one target product as a result of the production process performed with the optimized specific utility criterion.

Embodiments of the present invention thus provides suitable quality assurance measures are determined and integrated into the production process as additional steps in an automated process. In essence, the product quality is ensured in a cost and time-optimal way. This means that an optimization procedure is provided solving this optimization task in an automated manner.

Thus, embodiments of the invention disclosure described herein proposes the application of decision-theoretic approaches to ensure the quality, output and timeliness of manufactured products for flexible and adaptable production systems, by determining and integrating suitable quality assurance measures which are integrated into the production process in an optimal manner.

Thereby, a pareto-optimal sequence of production steps and quality assurance mechanisms can be determined that provides an optimal trade-off between target product quality, production time and production costs. Since the approach can be performed in an automated way, it can even be performed for flexible production scenarios down to a production of lot size 1.

Since the configuration of a production process, as well as the manufactured products themselves, constantly changes in the case of adaptable and flexible manufacturing scenarios, each new configuration of the production process must be assessed dynamically at runtime for each product that is to be produced with a new configuration. This is required to ensure that the requirements with respect to quality of the production process, as well as quality of the manufactured products themselves are met. In an embodiment, therefore, the method according to embodiments of the invention further comprises the step configuration of the production process with its steps which can be maximized according to the specific utility criterion.

In a further embodiment of the method according to embodiments of the invention a quality assurance measure associated with the product finished after the final production step is capable of independently initiating a reconfiguration and reassessment method step. This may be useful in the case the optional quality assurance measure results in a deterioration of quality of the product. If necessary, such a result can also cause an intervention by a third party.

According to another aspect, the disclosure provides a production system for manufacturing industrial unit goods in a production process solving an aspect of an embodiment of the invention, in which the production system comprises a plurality of manufacturing devices each of which associated with at least one production step of the production process, the system further comprising a plurality of QM-devices, each of which associated with at least one of the production steps and able to perform a quality assurance measure on the production step, and with at least one processing unit controlling and supervising the performance of steps of a manufacturing method associated with obtaining and assessing values related to decisions of performing quality assurance measures of QM-devices associated with the production steps, which decisions are dependent on a specific utility criterion dynamically optimized during the execution of the manufacturing method, wherein the specific utility criterion includes or combines a parametrization of at least one of achieved product quality, product output or timeliness.

In an embodiment, the processing unit of the production system according to embodiments of the invention the processing unit is based on a computer program product (non-transitory computer readable storage medium having instructions, which when executed by a processor, perform actions) running on a computer system being part of the production system. This ensures the quality, output and timeliness of the manufactured products for flexible and adaptable production systems. It is useful even more as suitable quality assurance measures need to be determined and integrated into the production process as additional steps in an automated process.

As an optimization procedure is required, which solves this optimization task in an automated manner, in an embodiment of the production system according to embodiments of the invention the processing unit controls the single productions steps and/or the quality assurance measures associated to the respective production steps.

In order to benefit from well-known quality assurance measures as well as from established processes or past experience, the processing unit of another embodiment of the production system according to embodiments of the invention comprises a manipulating means or a manipulator, by means of which an operating person is enabled to manipulate parameters influencing any of the production steps and/or any of the quality assurance measures and/or the specific utility criterion.

BRIEF DESCRIPTION

Some of the embodiments will be described in detail, with reference to the following figures, wherein like designations denote like members, wherein:

FIG. 4 is a schematic illustration of corresponding probability tables (left pane) and resulting maximum expected utilities (right pane).

The accompanying drawings are included to provide a further understanding of the present disclosure and are incorporated in and constitute a part of this specification. The drawings illustrate particular embodiments of the invention and together with the description serve to explain the principles of embodiments of the invention. Other embodiments of the invention and many of the attendant advantages of embodiments of the invention will be readily appreciated as they become better understood with reference to the following detailed description.

DETAILED DESCRIPTION

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
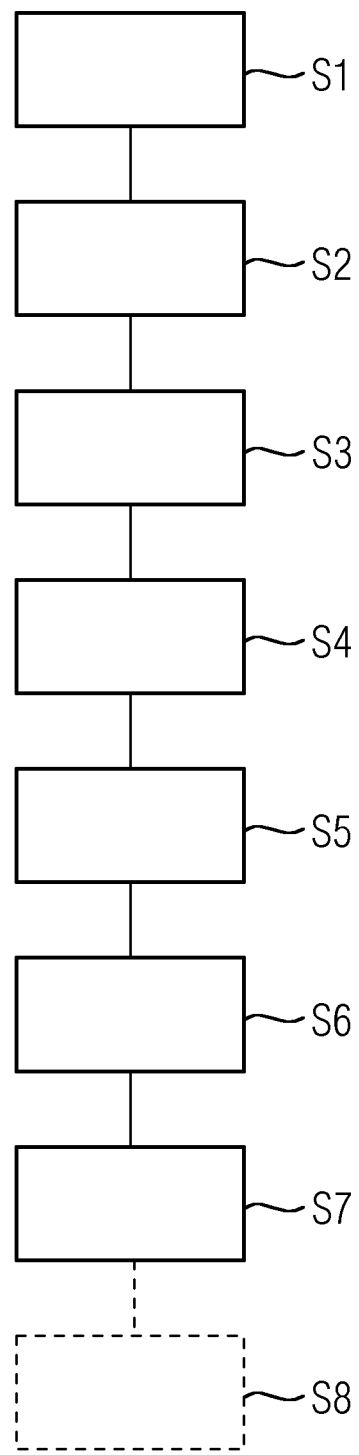
FIG. 1 is a schematic illustration of the manufacturing method depicted as a sequence of method steps.

Turning now to FIG. 1, this shows a schematic representation of the manufacturing process as a sequence of method steps S1 through S7. In this sequence of method steps, S1 represents step a., in which a selection of two or more of a plurality of potential production steps 12, 14, 16 forming the specific production process 10 suitable for the unit good to be manufactured is identified and chosen.

As these production steps 12, 14, 16 form the specific production process, a specific utility criterion for this process can be defined and established in step S2 representing method step b.

In a step S3 representing method step c., a suitable quality assurance measure QM1, QM2 is selected and respectively assigned to at least one of the production steps 12, 14, 16 and the selected and assigned quality assurance measure(s) QM1, QM2 is/are subsequently integrated into the production process 10.

In a step S4 representing method step d., each of the production steps 12, 14, 16 and, if applicable, its respective quality assurance measure QM1, QM2 is dynamically assessed, whereby probability and/or utility values related to each of the respective production steps 12, 14, 16 are obtained.

After having obtained these values, a method step e. is performed in step S5, wherein the production process 10 is dynamically assessed as a whole by applying a decision-theoretic-approach-based assessment to the probability and/or utility values obtained from the production steps 12, 14, 16 and its quality assurance measure QM1, QM2, respectively, in order to provide an optimized value of the specific utility criterion.

As a result of the dynamic assessment of the production process, at least one of the quality assurance measures (QM1, QM2) as indicated by an optimized value of the specific utility criterion is performed in step S6 representing method step f.

Consequently, at the end of the production process at least one target product is obtained in step S7 representing method step g. as a result of the production process 10 performed with the optimized specific utility criterion.

The step S8 indicated by dotted lines represents an optional method step h., in which a reconfiguration of the production process 10 and a reassessment of the quality assuring measure(s) takes place due to a reconfiguration of production steps.

Figure 2:
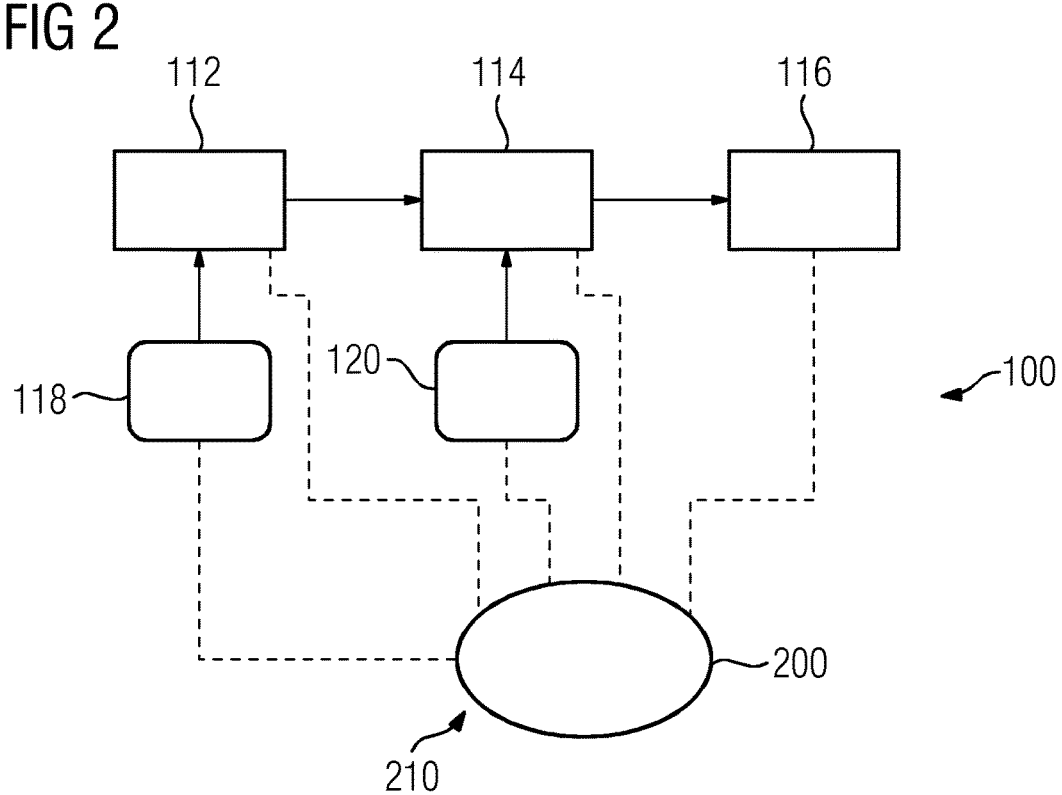
FIG. 2 is a schematic illustration of a production system performing a manufacturing method as shown in FIG. 1.

Turning now to FIG. 2, a schematic illustration of a production system 100 configured to perform a production process 10 is shown. One recognizes in detail there three single manufacturing devices 112, 114, 116, each of which is configured to perform one of the production steps 12, 14, 16, respectively. A QM-device 118 is assigned to the first manufacturing device 112, while a QM-device 120 is assigned to the second manufacturing device 114. Each of the QM-devices 118, 120 is therefore associated with at least one of the production steps 12, 14, 16 and able to perform a quality assurance measure QM1, QM2 on the specific production step 12, 14, 16 performed by the manufacturing devices 112, 114, 116, respectively.

Further, the production system 100 comprises a processing unit 200 controlling and supervising the performance of the steps of the manufacturing method associated with obtaining and assessing values related to decisions of performing quality assurance measures QM1, QM2 of the QM-devices 118, 120. The execution of supervising and controlling of each of the units 112, 1124, 116, 118, 120 shown in FIG. 2 by the processing unit 200 is indicated by the dashed connecting lines with the processing unit. The computer system 210 of the processing unit 200 running a computer program product which performs the necessary calculations is not further shown in FIG. 2.

Figure 3:
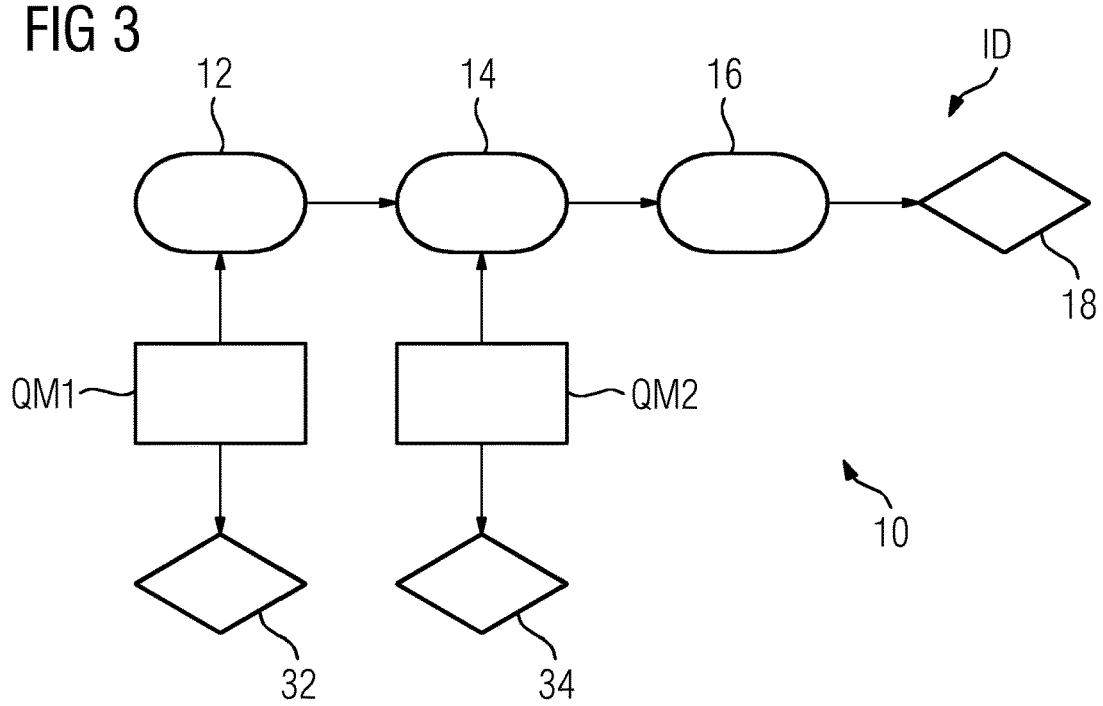
FIG. 3 is a schematic illustration of an Influence Diagram modeling a given production process configuration with three production steps.

With reference now to FIG. 3 of the drawings, a simple example is illustrated, considering a model of a given configuration of a production process 10 (which was determined dynamically at runtime for a product that is to be produced with the new configuration) comprising three subsequent production steps 12, 14, 16. Production steps 12 and 14 are provided with optional quality assurance measures QM1 and QM2, respectively, each of which incurs its specific amount of costs 32, 34. The final production step 16 without an associated quality assurance measure yields a value for the rate of products leaving the production process without defects, representing a figure to be optimized by performing quality assurance measures on preceding production steps 12, 14.

FIG. 4 illustrates the probability and utility tables (left pane) and resulting maximum expected utilities (right pane) corresponding to the production process 10 of FIG. 3. Without any quality assurance measures taken in the process of FIG. 3, the first production step 12 shows a scrap rate of 5 percent (illustrated in the second column of table 42), while the second production 14 step shows a scrap rate of 10 percent (illustrated in the third column of table 45) given that the intermediate product after step 1 is free from defects. The final production step 16 shows a scrap rate of 20 percent (illustrated in the first column of table 41), again given that the intermediate product is free from defects after the previous step, the second production step 14 in this case.

Suppose that a quality assurance measure QM1 can reduce the scrap rate for the first production step 12 from 5 percent down to 2 percent at the cost of 5 EUR (illustrated in tables 42 and 44), and a quality assurance measure QM2 can reduce the scrap rate for the second step from 10 percent down to 0.5 percent at the cost of 8 EUR (illustrated in tables 45 and 46). Let a product that is free from defects after the final production step have a value of 100 EUR; otherwise, the raw materials are wasted incurring a loss of EUR 20.

As mentioned above, the corresponding probability and utility tables are illustrated in the left pane in FIG. 4, in the tables of the right pane of FIG. 2 these probabilities and utilities are assigned with the resulting maximum expected utilities based on the use of methods of statistical decision theory. The results obtained, summarized in the maximum expected utility of the value of table 52, suggest that the expected utility, in this case the sum of the cost of quality assurance measure QM1 and QM2 (if performed), and the value the final product or loss due to wasted material, respectively, is maximized by choosing to perform QM2, but not QM1. This can be easily derived from the values in tables 54 and 68, respectively, assigning the decision not to perform QM1 a higher value in table 54, while at table 58 it behaves exactly the other way round. Since the production process actually has no time-critical component the specific utility criterion is therefore optimized on the basis of two of the three parameters, namely product quality and output.

Thus, according to embodiments of the invention described above, based on decision-theoretic approaches for determining and integrating suitable quality assurance measures into the production process, the possibility of ensuring the quality, output and timeliness of manufactured products for flexible and adaptable production systems is improved in an optimal and automated manner.

This is important in the context of flexible and adaptable production systems, as the production process as well as the manufactured products themselves constantly change, and each new configuration of the production process must be assessed dynamically during runtime of the production process for each product to be manufactured.

The planner of the production process can thereby plan new production processes including quality assurance mechanisms for a new product considering requirements with respect to the target production quality and determine the required costs and time for the production. This information is necessary e. g. to select a configuration of a flexible production plant which is optimal from an economical point of view and also to be able to provide an offer for a new product, i.e. whether to produce a product using the available production capabilities and, if yes, at which price and delivery date.

In this regard, the claimed method and production system is exemplary over heuristic methods, as these do not necessarily find a (optimal) solution, even if one exists, and over (mixed) Integer Linear Programming, which may be costly in terms of computation time and is not capable of integrating uncertainties, which inevitably need to be considered for the described flexible manufacturing scenarios (e.g. probability of failure or scrap rate, detection probabilities for different quality assurance measures).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing industrial unit goods in a production process, the method comprising a plurality of subsequent automated production steps, wherein the method includes:
   a. identifying and choosing a selection of two or more of a plurality of potential production steps forming the specific production process suitable for the unit good to be manufactured;
   b. defining and establishing a specific utility criterion for the production process, wherein the specific utility criterion includes a parametrization of achieved product quality;
   c. selecting and respectively assigning a suitable quality assurance measure to at least one of the production steps and integrating the quality assurance measure into the production process;
   d. dynamically assessing each of the production steps and its respective quality assurance measure whereby at least one of probability and utility values related to each of the respective production steps are obtained;
   e. dynamically assessing the production process as a whole by applying a decision-theoretic-approach-based assessment to the probability and/or utility values obtained from the production steps and its quality assurance measure, respectively, in order to provide an optimized value of the specific utility criterion;
   f. performing at least one of the quality assurance measures based on the optimized value of the specific utility criterion;
   g. obtaining at least one target product as a result of the production process performed with the optimized specific utility criterion,
   wherein the optimization problem of the respective production process to be solved with the decision-theoretic-approach is modeled by an influence diagram; and wherein the influence diagram associated with the respective production process is mapped to probability and utility tables as well as to resulting maximum expected utilities.

2. The method according to claim 1, further including
   h. reconfiguring the production process and reassessing the quality assuring measure according to a reconfiguration.

3. The method according to claim 1, further comprising reconfiguring the production process following a change of at least one production step or of at least one quality assurance measure.

4. The method according to claim 1, wherein the specific utility criterion is represented by an expectation value of a utility function.

5. The method according to claim 2, wherein the reconfiguring and reassessing are initiated based on a respective quality assurance measure associated with the product finished after the final production step.

6. A production system for manufacturing industrial unit goods in a production process, configured to perform the method according to claim 1, the system comprising a plurality of manufacturing devices each of which associated with at least one production step of the production process, the system further comprising a plurality of quality assurance devices (QM-devices), each of which associated with at least one of the production steps and able to perform a quality assurance measure on the specific production step, and with at least one processing unit controlling and supervising the performance of manufacturing associated with obtaining and assessing values related to decisions of performing quality assurance measures of QM-devices associated with the production steps, which decisions are dependent on a specific utility criterion dynamically optimized during the execution of the manufacturing, wherein the specific utility criterion includes a parametrization of achieved product quality.

7. The production system according to claim 6, wherein the at least one processing unit is based on a computer program product, comprising a computer readable hardware storage device having computer readable program code stored therein, said program code executable by a processor of a computer system to implement the method, running on a computer system being part of the production system.

8. The production system according to claim 6, wherein the processing unit controls the single production steps and/or the quality assurance measures associated with the respective production steps.

9. The production system according to claim 6, wherein the processing unit comprises a manipulating means or a manipulator, by which an operating person is enabled to manipulate parameters influencing at least one of the production steps; the quality assurance measure; and the specific utility criterion.

* * * * *